United States Patent [19]

Haartsen

[11] Patent Number: 5,842,037
[45] Date of Patent: Nov. 24, 1998

[54] INTERFERENCE REDUCTION IN TDM-COMMUNICATION/COMPUTING DEVICES

[75] Inventor: Jacobus Haartsen, Staffanstrop, Sweden

[73] Assignee: Telefonaktiebolaget LM Ericsson, Stockholm, Sweden

[21] Appl. No.: 406,583

[22] Filed: Mar. 20, 1995

[51] Int. Cl.$^6$ ............................................. G06F 13/00
[52] U.S. Cl. ..................... 395/821; 375/219; 375/346; 455/296; 395/868
[58] Field of Search ............................ 395/821, 868, 395/733; 375/219, 296, 346; 455/296

[56] References Cited

U.S. PATENT DOCUMENTS

| | | | |
|---|---|---|---|
| 4,484,302 | 11/1984 | Cason et al. | |
| 5,280,587 | 1/1994 | Shimodaira et al. | 395/275 |
| 5,280,644 | 1/1994 | Vannatta et al. | 455/265 |
| 5,307,066 | 4/1994 | Kobayashi et al. | 341/155 |
| 5,471,663 | 11/1995 | Davis | 455/296 |
| 5,511,204 | 4/1996 | Crump et al. | 395/750 |
| 5,546,464 | 8/1996 | Raith et al. | 380/48 |

FOREIGN PATENT DOCUMENTS

| | | |
|---|---|---|
| 499 440 | 8/1992 | European Pat. Off. . |
| 553862 | 8/1993 | European Pat. Off. . |
| 0 553 862 A2 | 4/1993 | Japan ................ G06F 1/32 |

*Primary Examiner*—Thomas C. Lee
*Assistant Examiner*—Ario Etienne
*Attorney, Agent, or Firm*—Burns, Doane, Swecker & Mathis, L.L.P.

[57] ABSTRACT

A method for suppressing interference in an integrated communication/computing device is disclosed. First, an interrupt signal is sent from a transceiver to a computing device when the transceiver is about to transmit or receive information. In response to the interrupt signal, the computing device stacks current status and enters an interrupt routine. The computing device is then released from the interrupt routine after the information has been transmitted or received.

26 Claims, 1 Drawing Sheet

INTERFERENCE REDUCTION IN TDM-COMMUNICATION/COMPUTING DEVICES

FIELD OF THE DISCLOSURE

The present invention relates to all areas where wireless communications, based on a Time-Division multiplexing (TDM) method, and computing are combined into a single device, and more particularly to a method for reducing interference in TDM-communication/computing devices.

BACKGROUND OF THE DISCLOSURE

The general trend in consumer electronics today is an integration of communicating and computing facilities into a single unit. Examples are laptops, wirelessly connected to remote hosts (e.g., PC at home), personal communicators that combine a phone, an organizer, and many more function into a single electronic device, etc. This integration of wireless communications and computing raises problems with ElectroMagnetic Interference (EMI) and ElectroMagnetic Compatibility (EMC).

During wireless transmission, high-power radiation from a transceiver interferes with the processors and other electronics in the computing section of the device. This is especially the case for high instantaneous power, discontinuous transmission as found in time division multiple access (TDMA) communications (e.g., GSM, D-AMPS, DECT). Transmission takes place in a burst format with short, but repetitive bursts with high energy levels. Crosstalk between the transceiver and the computing electronics will likely disturb the signal levels in the digital electronics, giving rise to errors in the computing process. Other access methods that use continuous transmission (FDMA, or CDMA) can use lower instantaneous power levels, which are less likely to interfere with the computing electronics.

During wireless reception, the transceiver is opened to receive the burst from the antenna. However, now any electromagnetic radiation from the computing electronics can disturb the reception. This is especially a problem in high-speed, digital electronics, where steep edges and spikes at the signal level transitions can produce considerable radiation. With the ever-increasing clock frequencies of digital electronics, radiation from the computing electronics to the receiving unit will become more and more of a problem, irrespective of what kind of access method is used (TDMA, FDMA, CDMA, etc.).

If future integrated communications/computing devices will be using the TDMA wireless cellular communications now implemented worldwide, then an efficient means of suppressing the mutual interference between transceiver and computing electronics must be found.

SUMMARY OF THE DISCLOSURE

It is an object of the present invention to provide an efficient way of suppressing mutual interference between a transceiver and computing electronics which are integrated in a communication/computing device. In an integrated communications/computing device, mutual electromagnetic interference can be avoided by communicating and computing at different times. For an TDMA based communication, this means that the computing operations are only performed when no transmission or reception is taking place. In other words, the computing operation can only be performed in between the transmit and/or receive bursts. This can conveniently be performed by using an interrupt on the computing processor that is activated just before the start of a TDMA burst (transmission and/or reception). The computing processor enters a sleep or hold mode directly or first stacks its current status and then enters the hold or sleep mode. Since a processor in a hold or sleep mode is insensitive to electromagnetic radiation and produces no interference itself, electromagnetic interference problems do not arise. After the TDMA burst is over, the interrupt is released and the processor is free to continue its normal operation.

According to one embodiment of the present invention, a method for suppressing interference in an integrated communication/computing device is disclosed. First, an interrupt signal is sent from a transceiver to a computing device when the transceiver is about to transmit or receive information. In response to the interrupt signal, the computing device stacks current status and enters an interrupt routine. The computing device is then released from the interrupt routine after the information has been transmitted or received.

According to another embodiment of the present invention, an integrated communication/computing apparatus is disclosed. The integrated communication/computing apparatus comprises a transceiver for transmitting and receiving information and processing means for processing data. An interrupt means interrupts the operation of the processing means when the transceiver is about to transmit or receive information. In response to the interrupt, the processing means enters an interrupt mode. Restoring means restores the operation of the processing means after the transceiver has finished transmitting or receiving the information.

BRIEF DESCRIPTION OF THE DRAWINGS

These and other features and advantages of the present invention will be readily apparent to one of ordinary skill in the art from the following written description, used in conjunction with the drawings, in which.

DETAILED DESCRIPTION OF THE DISCLOSURE

Figure 1:
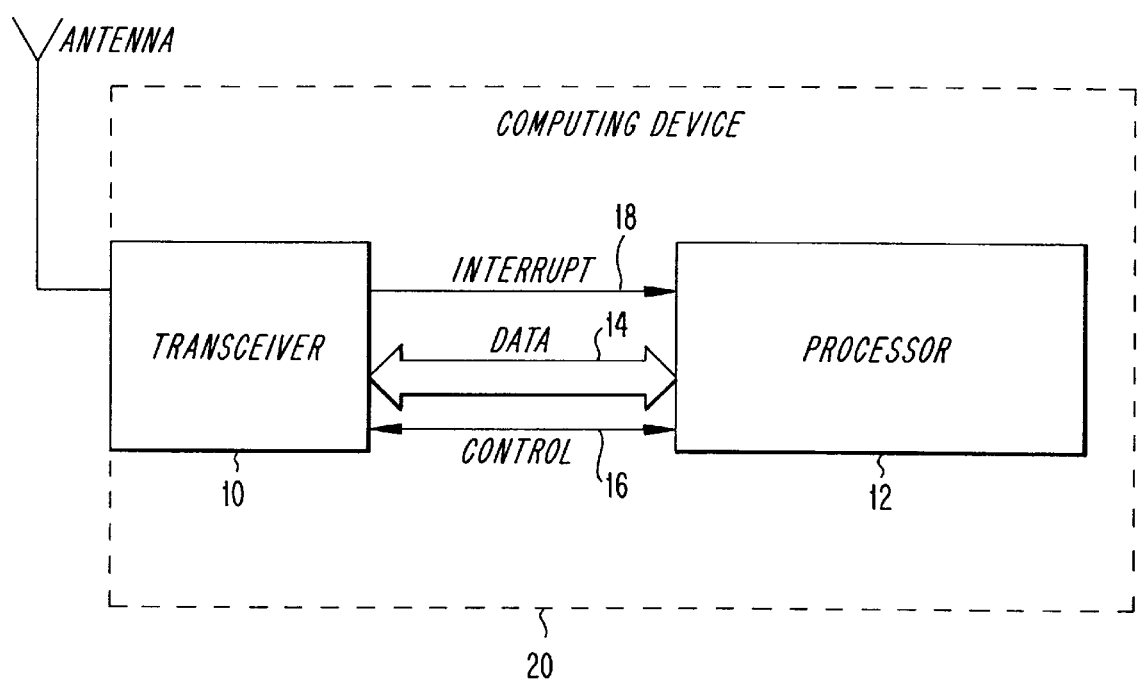
FIG. 1 illustrates a block diagram of a wireless communications/computing device according to one embodiment of the present invention.

The present invention will now be described in connection with integrated communication/computing devices. It will be understood by one of ordinary skill in the art that the term "computing device" applies to any device which contains a processor or a microprocessor or performs calculations or computations on data. Examples of integrated communication/computing devices are notepad or palmtop computers, wirelessly linked to a cellular radio network, or advanced wireless, personal communicators that combine local computing functions with wireless voice/data communications. The present invention also applies to (larger) computing devices, e.g. personal computers, equipped with an additional radio component, for example in the form of a PCMCIA card.

Although TDMA-based communications provides an unattractive environment for integrating communications and computing because of the discontinuous, high instantaneous power based transmission, it also provides a way to prevent the interference. A TDMA system works on a time based concept. Electromagnetic interference problems occur when both communication and computing are performed at the same time. If either the communication is stopped during the computing operation or the computing operation is stopped during communication, the electromagnetic interference problems will not occur. Since TDMA communications already operates in a stop-and-go manner, the electromagnetic interference problems can be eliminated by implementing the stop-and-go concept in the computing electronics as well. Essentially, this means that during the TDMA transmission (and if necessary during the TDMA reception as well), the computing operations in the processor are temporarily stopped. If the computing section of the device is not in operation during the time of transmission, disturbances on the electronic signal levels are of no consequence since the computing section is not being used. As soon as the transmission is finished, the computing process continues until the start of the next transmit or receive burst.

A block diagram of an integrated communications/computing device 20 according to one embodiment of the present invention is illustrated in FIG. 1. The transceiver block 10 is a TDMA radio, for example, based on the GSM system, the D-AMPS system, or the DECT system. The radio can be built into the device as an integral part, or can, for example, be added in the form of a PCMCIA card, which is inserted in a slot of the computing device 20 (notebook, laptop, PC). The processor 12 in the computing device 20 communicates with the transceiver 10 over a data path 14 and a control path 16. However, there is an additional interrupt path 18 from the transceiver 10 to the processor 12. Computer ports and PCMCIA slots already provide an interrupt line that enables an external device connected to the port or slot to provide an interrupt signal to the processor 12. When the processor 12 receives an interrupt signal because the transceiver 10 is going to transmit or receive a communications burst, the processor 12 can respond in two ways. In one embodiment of the present invention, the processor 12 can directly enter a hold mode in which all signals in the processor are temporarily "frozen". No signal transitions take place and all lines keep the signal level they had when entering the hold mode. This is, for example, feasible in processors that use static logic where signals are stored in flipflops. A simple way of achieving this is by just stopping the clock of the processor. This can for example be done by gating the system clock provided to the processor. If, however, dynamic logic is used where the signals are stored as a charge on a capacitor, leakage will cause loss of information when the processor is forced into a hold mode. In that case, the processor first has to store its current status (like the program counter and the contents of the registers) in RAM, usually called the stack. This is a nonvolatile memory where the information can be kept indefinitely. After the current status has been stored the processor can enter the hold or sleep mode.

In the current invention, the interrupt routine can be a hold mode, a partial power-down mode, or a sleep mode. Presently, many processors have sleep modes in order to reduce power consumption. Other techniques, well known to those skilled in the art of microprocessor and signal processor design, can be applied to place the processor temporarily in a hold or sleep mode. During the hold or sleep mode, the computing processor 12 does nothing, and therefore electromagnetic interference from wireless transmission will not have any effect on the computing operation. Furthermore, since there are no signal transitions, no disturbance is produced in the computer unit that could adversely affect the wireless transceiver unit 10. According to one embodiment of the present invention, the interrupt can be given well before the TDMA burst starts so as to give the processor 12 time to stack the required data and to make preparations for the hold or sleep mode. With the current high processor rate in the MIPS (Million of Instructions Per Second) range, this only costs a little overhead. When the transmission or reception is finished, the processor returns to the normal operational mode and continues where the processor left off before going into the hold mode. When the communication burst has passed, the processor can be brought to life again either by a signal on the control path from the transceiver, by feeding the system clock again to the processor, by having a timer which counts the (fixed) length of the burst and signals the processor at the end of the burst, or some other means well-known to those skilled in the art of microprocessors and digital signal processors (DSPs). This re-activation means should be robust against EMI, i.e., should have hard signal levels. It will be understood by one of ordinary skill in the art that the processor 12 can enter the same interrupt mode or different interrupt modes depending on whether the transceiver is transmitting or receiving a burst.

Putting the computer on hold during wireless transmission (and/or reception) will of course slow down the computing process. However, the reduction is not very large. In an 8-slot TDMA pattern like GSM, 12.5% is lost when the hold mode is used only during the transmit burst, and 25% is lost if both transmit and receive bursts interrupt the computing process. The guard time in front of the burst for interrupt handling can usually be ignored. A 30 MIPS processor, for example, only needs 1 $\mu$s to do 30 instructions for the stacking. When comparing this to a GSM burst with a length of 577 $\mu$s, this guard time is negligible. If no stacking is required, the guard time is even less important. One should also take into account that the processor runs at full speed when no wireless transmission takes place.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. A method for suppressing interference in an integrated communication/computing device, comprising the steps of:

sending an interrupt signal to a computing device from a transceiver when said transceiver is about to transmit or receive information over a communication channel having a defined timing;

entering an interrupt routine at the computing device in response to the interrupt signal at times that corresponds to the defined timing of the communication channel; and releasing said computing device from the interrupt routine after the information has been transmitted or received.

2. A method for suppressing interference in an integrated communication/computing device according to claim 1, wherein said computing device enters a hold mode in said interrupt routine.

3. A method for suppressing interference in an integrated communication/computing device according to claim 1, wherein said computing device enters a power down mode in said interrupt routine.

4. A method for suppressing interference in an integrated communication/computing device according to claim 1, wherein said computing device enters a sleep mode in said interrupt routine.

5. A method for suppressing interference in an integrated communication/computing device according to claim 1, wherein said information is contained in a TDMA burst.

6. A method for suppressing interference in an integrated communication/computing device according to claim 1, wherein said computing device stacks current status before entering the interrupt routine.

7. A method for suppressing interference in an integrated communication/computing device according to claim 6, wherein said current status is stacked in a nonvolatile memory.

8. A method for suppressing interference in an integrated communication/computing device according to claim 7, wherein said nonvolatile memory is a RAM.

9. A method for suppressing interference in an integrated communication/computing device according to claim 1, wherein the computing device is released from the interrupt routine by a signal from the transceiver.

10. A method for suppressing interference in an integrated communication/computing device according to claim 1, wherein said computing device is released from the interrupt routine after a predetermined period of time.

11. A method for suppressing interference in an integrated communication/computing device according to claim 1, wherein the computing device is interrupted by stopping a clock in said computing device.

12. A method for suppressing interference in an integrated communication/computing device according to claim 1, wherein the computing device is interrupted by gating a system clock provided to the computing device.

13. A method for suppressing interference in an integrated communication/computing device according to claim 11, wherein the computing device is released from the interrupt routine by starting the clock.

14. An integrated communication/computing device comprising:

a transceiver for transmitting and receiving information over a communication channel having a defined timing;

a processing means for processing data;

an interrupt means for interrupting the operation of said processing means when said transceiver is about to transmit or receive information, wherein said processing means enters an interrupt mode at times that corresponds to the defined timing of the communication channel; and means for restoring the operation of said processing means after said transceiver has finished transmitting or receiving said information.

15. An integrated communication/computing apparatus according to claim 14, wherein said information is contained in a TDMA burst.

16. An integrated communication/computing apparatus according to claim 14, wherein said processing means enters a hold mode in said interrupt routine.

17. An integrated communication/computing apparatus according to claim 14, wherein said processing means enters a power down mode in said interrupt routine.

18. An integrated communication/computing apparatus according to claim 14, wherein said processing means enters a sleep mode in said interrupt routine.

19. An integrated communications/computing apparatus according to claim 14, wherein said processing means stores current status before entering the interrupt mode.

20. An integrated communication/computing apparatus according to claim 19, wherein said current status is stacked in a nonvolatile memory.

21. An integrated communication/computing apparatus according to claim 20, wherein said nonvolatile memory is a RAM.

22. An integrated communication/computing apparatus according to claim 14, wherein said processing means freezes signal levels on lines in said processing means before entering the interrupt mode.

23. An integrated communication/computing apparatus according to claim 14, wherein said restoring means restores the operations of the processing means after a predetermined period of time.

24. An integrated communication/computing apparatus according to claim 14, wherein said processing means is interrupted by stopping a clock in said processing means.

25. An integrated communication/computing apparatus according to claim 14, wherein said processing means is interrupted by gating a system clock provided to said processing means.

26. An integrated communication/computing apparatus according to claim 25, wherein said restoring means restores the operations of the processing means by ungating the system clock provided to the processing means.

* * * * *